US008429759B2

(12) United States Patent
Adrangi

(10) Patent No.: US 8,429,759 B2
(45) Date of Patent: Apr. 23, 2013

(54) THEFT MANAGEMENT SYSTEM AND METHOD

(75) Inventor: Farid Adrangi, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 387 days.

(21) Appl. No.: 12/415,952

(22) Filed: Mar. 31, 2009

(65) Prior Publication Data

US 2010/0251391 A1 Sep. 30, 2010

(51) Int. Cl.
*G06F 21/00* (2006.01)
(52) U.S. Cl.
USPC ............. 726/34; 726/35; 340/500; 340/568.1
(58) Field of Classification Search ................. 726/34, 726/35; 340/500, 568.1
See application file for complete search history.

(56) References Cited

U.S. PATENT DOCUMENTS

| | | | | |
|---|---|---|---|---|
| 5,809,413 | A * | 9/1998 | Meche et al. | 455/411 |
| 6,662,023 | B1 * | 12/2003 | Helle | 455/558 |
| 7,531,007 | B2 * | 5/2009 | Sharma | 726/35 |
| 2002/0157007 | A1 * | 10/2002 | Sashihara | 713/183 |
| 2004/0203615 | A1 * | 10/2004 | Qu et al. | 455/412.1 |
| 2004/0248562 | A1 | 12/2004 | Kim | |
| 2005/0197144 | A1 * | 9/2005 | Tam et al. | 455/466 |
| 2006/0021059 | A1 * | 1/2006 | Brown et al. | 726/26 |
| 2006/0179157 | A1 * | 8/2006 | Huang | 709/238 |
| 2008/0132256 | A1 * | 6/2008 | Noldus | 455/466 |
| 2008/0169932 | A1 * | 7/2008 | Desrosiers et al. | 340/573.1 |
| 2008/0293397 | A1 * | 11/2008 | Gajdos et al. | 455/420 |
| 2008/0301112 | A1 * | 12/2008 | Wu | 707/5 |
| 2009/0017819 | A1 * | 1/2009 | Fox et al. | 455/435.1 |
| 2009/0183266 | A1 * | 7/2009 | Tan et al. | 726/35 |
| 2009/0203389 | A1 * | 8/2009 | Bhat | 455/466 |
| 2010/0070642 | A1 * | 3/2010 | Bansal et al. | 709/230 |
| 2010/0159911 | A1 * | 6/2010 | Childs et al. | 455/419 |
| 2010/0198728 | A1 * | 8/2010 | Aabye et al. | 705/44 |

FOREIGN PATENT DOCUMENTS

| | | |
|---|---|---|
| JP | 8251660 A | 9/1996 |
| JP | 9-121387 A | 5/1997 |
| JP | 2005-534254 A | 11/2005 |
| WO | 2004/012470 A1 | 2/2004 |
| WO | 2004/098137 A1 | 11/2004 |
| WO | 2007027065 A1 | 3/2007 |
| WO | WO 2007027065 A1 * | 3/2007 |

OTHER PUBLICATIONS

"Management Component Transport Protocol (MCTP)", Overview White Paper, Version 1.0.0a, DSP2016, Distributed Management Task Force Inc. (DMTF), Jul. 2007, 15 Pages.
Office Action Received for Japanese Patent Application No. 2010-075999 mailed on Nov. 22, 2011, 2 pages of Office Action and 2 pages of English Translation.

* cited by examiner

*Primary Examiner* — Nathan Flynn
*Assistant Examiner* — Sarah Su
(74) *Attorney, Agent, or Firm* — Caven & Aghevli LLC

(57) ABSTRACT

Methods and apparatus for theft management are described. In an embodiment an out-of-band notification is received, indicative of theft of a computing device. In response, a theft message is delivered to the computing device using a wireless wide area network. Other embodiments are also disclosed and claimed.

26 Claims, 6 Drawing Sheets

THEFT MANAGEMENT SYSTEM AND METHOD

FIELD

The present disclosure generally relates to the field of electronics. More particularly, some embodiments of the invention relates to a theft management system and method.

BACKGROUND

Some current anti theft technology for computing devices may rely on a hardened system authentication, hardware based encryption and an in-band (IB) remote lock packet. A theft alert (via an IB remote lock packet) may be sent to a chipset of the computing device over the Internet through a user's operating system (OS). On receipt of the theft alert, the chipset may disable the computing device. However, such theft alert mechanisms depend on Internet protocol/Internet connectivity and the user's operating system for routing the theft alerts to the chipset of the computing device.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments.

As will be discussed in more detail below, some embodiments of the invention may provide a technique for delivering theft alert(s) to a computing device via a wireless communication channel, e.g., without regard for host/user operating system(s) executing on the computing device and/or a pre-established or initiated communication channel (e.g., by a user). As used herein, the term "deliver" and its derivatives are intended to be interchangeable with "transmit" and its derivatives. The computing device may be any type of a computing device with wireless communication capability, including, for example, mobile devices (such as a mobile phone, a laptop computer, a personal digital assistant (PDA), an ultra-portable personal computer, etc.) or non-mobile computing device (such as a desktop computer, a server, etc.).

The wireless communication capability may be provided by any available wireless connection, e.g., using a Wireless Wide Area Network (WWAN) such as $3^{rd}$ Generation (3G) WWAN (e.g., in accordance with International Telecommunication Union (ITU) family of standards under the IMT-2000), Worldwide Inter-operability for Microwave Access ("WiMAX, e.g., in accordance with Institute of Electrical and Electronics Engineers (IEEE) 802.16, revisions 2004, 2005, et seq.), Bluetooth® (e.g., in accordance with s IEEE Standard 802.15.1, 2007), Radio Frequency (RF), WiFi (e.g., in accordance with IEEE 802.11a, 802.11b, or 802.11g), etc.

In an embodiment, incoming Short Message Service (SMS) messages may be filtered by a network interface card of a computing device to detect an out-of-band SMS message and to deliver the out-of-band message to a chipset of the computing device. In one embodiment, processing theft alert messages may be processed by hardware security versus in software or basic input/output system (BIOS) of the computing device.

Figure 1:
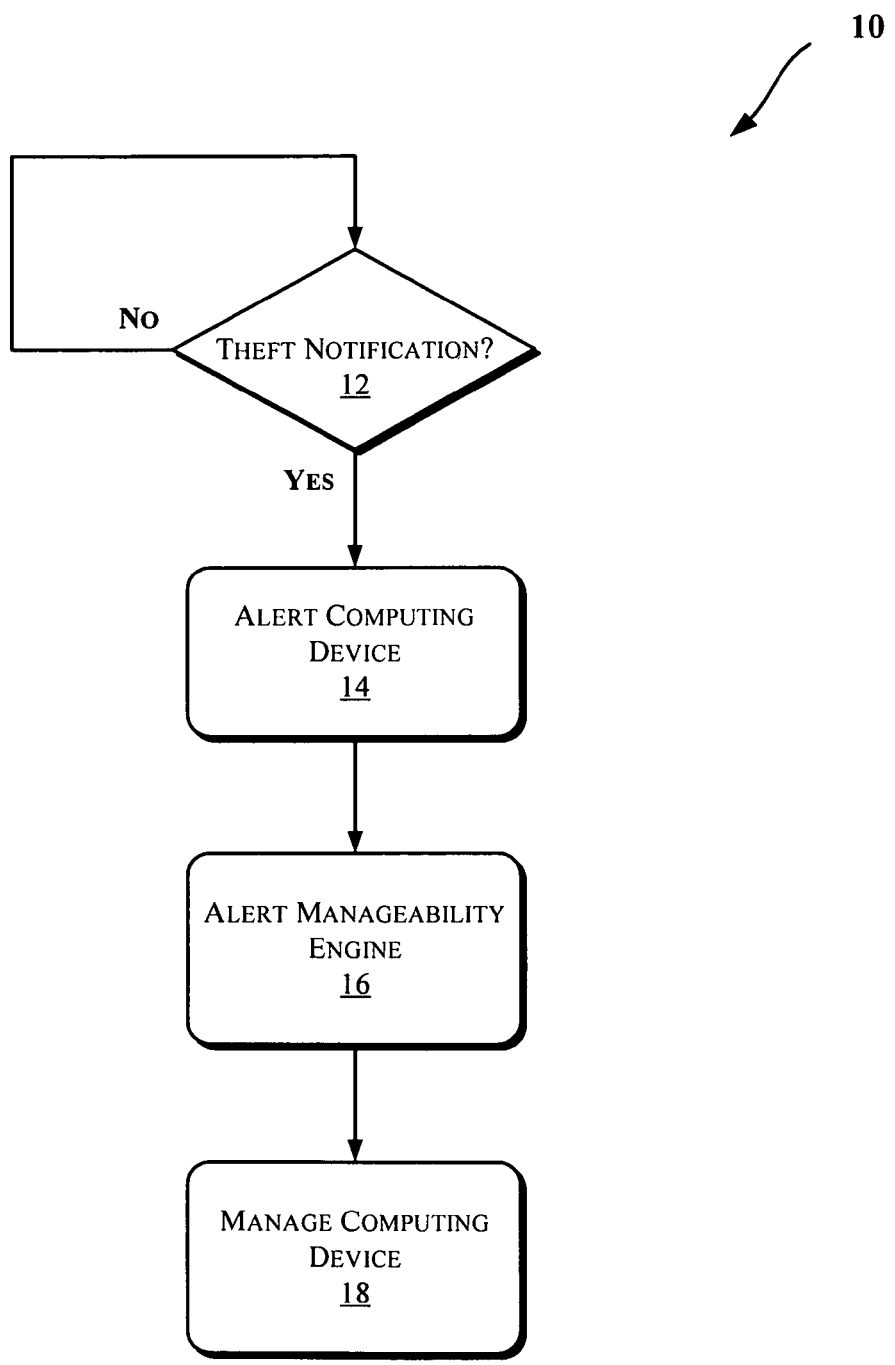
FIG. 1 illustrates a theft management method in accordance with an embodiment.

Referring first to FIG. 1, a theft management method 10 is illustrated, in accordance with an embodiment. At block 12, a notification indicative of a theft (or unauthorized removal) of a computing device is received. As discussed above, the computing device may include any type of a computing device with wireless communication capabilities such as a desktop computer, a laptop computer, a server, or a hand-held computing device. For example, a user may report the theft of the computing device to a theft management server. Also, with computing devices that include an RF tag, a detector may notice movement of the computing device outside of a pre-defined zone, e.g., indicating unauthorized removal or theft. The theft management server may be a part of a corporate network or a service organization. At block 14, a theft alert message is delivered to the computing device, e.g., using a wireless network. In an embodiment, the theft message is delivered to the computing device using a WWAN. In one embodiment, the theft message is delivered to the computing device using a 3G network.

In one embodiment, at operation 12, the theft management server delivers the theft message to a 3G Short Message Service (SMS) gateway, e.g., using an Internet protocol (IP) connection. The theft message type may be identified as an Out-Of-Band (OOB) message at operation 12. Further, the 3G SMS gateway delivers the theft message to a Network Interface Card (NIC) of the computing device through a 3G SMS interface at operation 14. In some embodiments, the SMS payload (i.e., the theft message) may include an application header to indicate that this SMS carries an OOB message. The application header may also include a Vendor Identifier (ID) and an operator address (e.g., in form of short code or long number) assigned to the server by the operator.

In one embodiment, when an incoming SMS message is received, the 3G NIC examines the application header for its Vendor ID, and if it matches with the pre-configured vendor ID, then the NIC determines that this is an OOB SMS. In order to prevent SMS spoofing and Denial Of Service (DOS) attack on a chipset (responsible for processing OOB SMS messages), the NIC checks the SMS header to make sure that the received OOB SMS messages is not a mobile initiated SMS to detect spoofing OOB SMS messages from a mobile handset. Furthermore, the NIC may compare the address of the SMS originator against the address embedded in the application header of the SMS payload to detect rogue OOB SMS generated from a web server by an attacker. If any spoofing is detected, then the NIC may silently discard the SMS. Otherwise, the NIC may store the SMS message in a flash memory allocated to OOB SMS messages, which is separated from normal user SMS messages.

In an embodiment, a Manageability Engine (ME) implements Attention (AT) commands (e.g., defined by 3rd Generation Partnership Project (3GPP)) for sending and receiving SMS messages. The ME may be coupled to various components of a computing device (directly or through a bus or interconnect) including, for example, a 3G NIC, a chipset and/or processor(s). In some embodiments, a System Management Bus (SMBus) and its transport protocol stack will be used to transport the AT commands and responses between the ME and the 3G NIC. However, embodiments of the invention are not limited to SMBus and other communication channels may be used to communicate commands, data, or signals between various components discussed herein, including, for example, Universal Serial Bus (USB), Bluetooth, any direct wire connection, bus/interconnect, Peripheral Component Interconnect (PCI), PCI express (PCIe), etc. The 3G NIC may differentiate the source of the AT command (whether it issued from the host/user OS or ME) and therefore it can handle user SMS and OOB messages simultaneously and route them appropriately to the host/user OS or the ME. Accordingly, the normal operation of the user SMS will not be impacted in an embodiment.

At block 16, the theft message from the network interface card of the computing device is transmitted to a manageability engine of the computing device, e.g., using a sideband bus such as an SMBus and without having any dependency on the host/user operating system. If the ME is unavailable at operation 16, the message may be stored in a memory of the NIC (that is non-volatile for example) for later delivery (e.g., when the ME becomes available). At block 18, the computing device is managed (e.g., disabled) in response to receipt of the theft message. In particular, the manageability engine may take appropriate action in response to the theft message for managing the computing device, such as disabling/locking one or more components of the computing device, including for example, the chipset, hard drive, display device, etc.

In one embodiment, a theft alter (e.g., remote lock) message is delivered to the manageability engine of the computing device. The remote lock message may be delivered to chipset of the computing device through the system management bus (SMBus). Subsequently, the entire or portion of the computing device is disabled in response to receipt of the lock message by the chipset of the computing device. In some embodiments, an acknowledgement of the computing device being successfully locked or disable may be delivered to the theft management server.

Further, a location of the computing device in the stolen mode may also be transmitted to the theft management server in one embodiment. For example, Global Positioning System (GPS) or IEEE 802.11n location information may be retrieved from the 3G NIC via the appropriate AT command by the ME, and sent (either in encrypted or non-encrypted form) to the theft management server wirelessly, e.g., over 3G SMS transport. Once the computing device is recovered from the location, the theft management server may send a remote unlock message to the chipset of the computing device to unlock the device. In one embodiment, the unlock message to the chipset is delivered over 3G SMS interface.

In some embodiments, the OOB message delivery mechanism may be utilized to notify the manageability engine about occurrence of events such as switching off of a radio of the computing device, WWAN link being down and so forth. On receipt of such alerts, the manageability engine may take appropriate actions such as disabling of the computing device or enforcing a user to re-authenticate. In accordance with some embodiments, the message delivery mechanisms do not have any dependency on the user/host operating system(s) of the computing device or require the computing device to maintain IP connectivity. Further, the theft management server may deliver the out-of-band messages to the computing device in all Advanced Configuration and Power Interface (ACPI) power and host/user operating system states. In addition, a thief of the computing device may not be able to mitigate the theft management technique described above by performing actions such as turning off the radio or by removing the network interface card.

Figure 2:
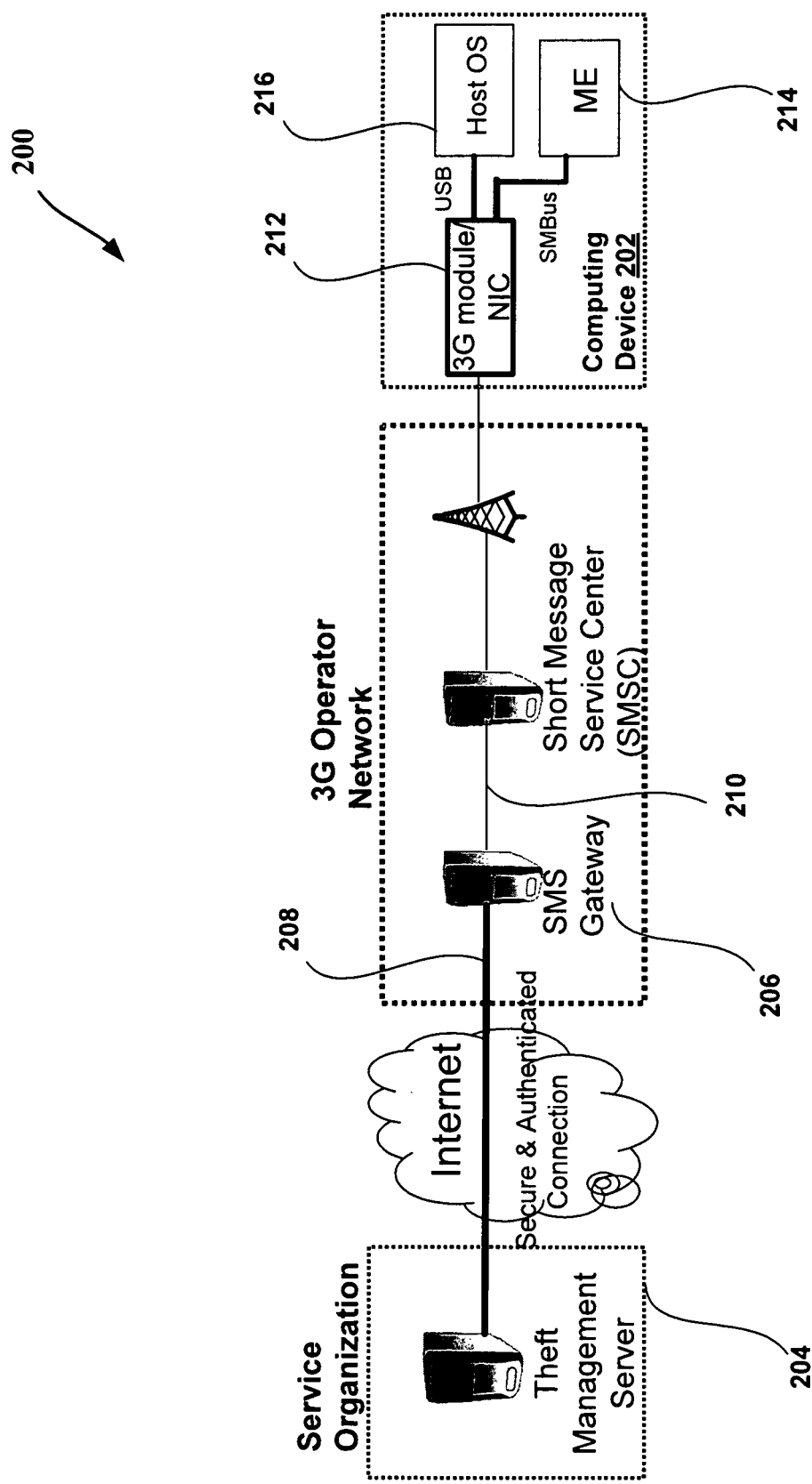
FIG. 2 illustrates a configuration of a theft management system in accordance with an embodiment.

FIG. 2 illustrates a configuration 200 of a theft management system, according to an embodiment. One or more of the operations discussed with reference to FIG. 1 may be performed by component(s) of FIG. 2. As illustrated, the system 200 includes a computing device 202 and a theft management server 204 (e.g., to detect a theft of the computing device 202 and to deliver a theft alert message representative of the theft to the computing device 202). In an embodiment, the theft management server 204 delivers the theft alert message to the computing device 202 using a wireless wide area network. The theft management server 204 may reside in a corporate network or in a service organization intranet. The system 200 also includes a 3G SMS gateway 206 that may be managed by a 3G service operator.

The SMS gateway 206 includes a first interface 208 such as an Internet Protocol (IP) interface to communicate with the theft management server 204. The SMS gateway 208 also includes a second interface 210 such as a 3G SMS interface to communicate with the computing device 202 (e.g., via an SMS Center). In an embodiment, the computing device 202 includes embedded wireless wide area network hardware such as a network interface card (e.g., 3G module 212) to receive and process mobile generated and/or SMS gateway generated short message service messages.

The computing device 202 also includes a manageability engine 214 to receive the theft message from the network interface card 212 and to manage the computing device 202 in response to receipt of the theft message. The computing device 202 may also include memory to store a host/user OS 216 (which may be executed on one or more processors of the computing device 202). As shown, the host/user OS 216 may communicate with the NIC 212 via a bus (such as the illustrated USB). Further, the ME 214 may communicate with the NIC 212 via a different bus (such as the illustrated SMBus). Alternatively, the same bus may couple the NIC 212 to OS 216 and/or ME 214. In an embodiment, if a single bus/interconnect couples the NIC 212 to OS 216 and/or ME 214, different types of messages/packets/signaling may be used to distinguish communication between the NIC and OS versus the NIC and ME. Further, any type of bus/interconnect, dedicated wires, signaling, etc. may be used between the ME 214 and NIC 212. In one embodiment, the manageability engine 214 disables the computing device (or one or more of its components such as its chipset, processor(s), hard drive, etc.) in response to a lock message received from the network interface card 212.

In an embodiment, in response to a theft report, the theft message is delivered over an IP connection 208 to the 3G SMS gateway 206. The theft message type may be identified as an out-of-band (OOB) message. Subsequently, the 3G SMS gateway 206 sends the theft message payload to the network interface card 212 over the 3G SMS interface 210, for example, as network initiated SMS. Once the network interface card receives the SMS containing the theft message, it delivers it to the chipset (not shown) of the computing device 202 right away or it stores it for later delivery if the sideband bus for the manageability engine 214 is not available or not powered to transport or receive the message. The manageability engine may then take appropriate actions in response to the SMS containing the theft message, e.g., as discussed with reference to block 18 of FIG. 1.

Figure 3:
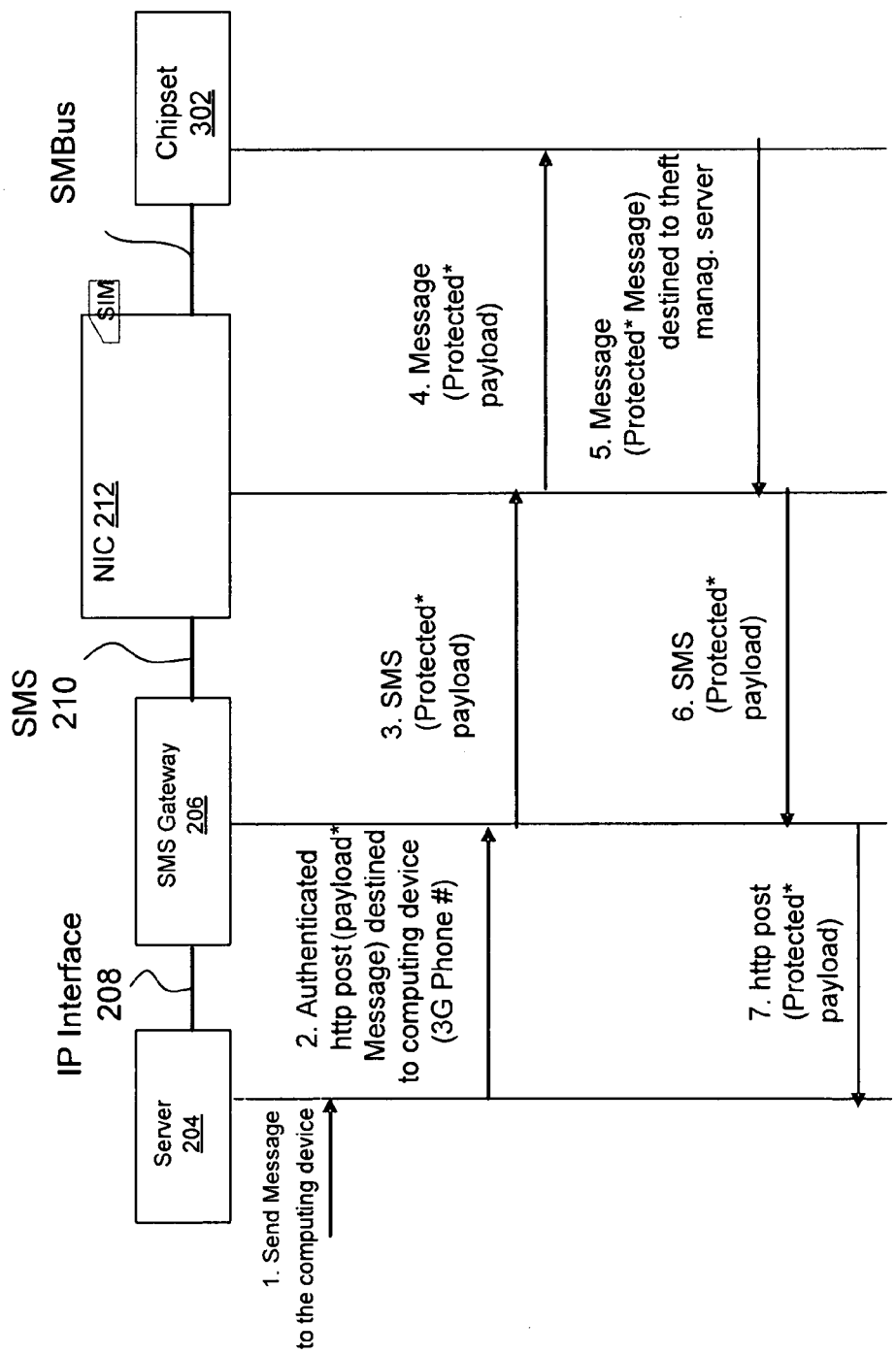
FIG. 3 illustrates message flow between a theft management server and a manageability engine of a computing device, in accordance with some embodiments.

FIG. 3 illustrates message flow between a theft management server (such as server 204 of FIG. 2) and a manageability engine of the computing device (such as ME 214 of FIG. 2). The theft management server 204 receives a notification to send (1) a theft message to the computing device 202. As can be seen, the theft management server 204 sends (2) the theft message to the 3G SMS gateway 206, e.g., using the IP interface 208. Further, the 3G SMS gateway 206 sends (3) the theft message payload to wireless wide area network (WWAN) network interface card 212 (which may include a Subscriber Identity Module (SIM) such as shown) over the 3G SMS interface 210. Subsequently, the message payload (4) may be delivered to a chipset 302 of the computing device 202. The message delivery protocol between the network interface card 212 and the chipset 302 may be implemented as propriety messages over system management bus (SMBus). In an embodiment, upon receipt of the message (3), the network interface card 212 extracts the theft payload and sends the payload to a manageability engine (e.g., ME 214 of FIG. 2) over SMBus.

In an embodiment, the message may be delivered using standard AT commands over SMBus. The manageability engine will receive the incoming theft alert SMS messages (also referred to as out-of-band SMS messages) whose payload is includes (or is pre-pended with) an OOB header (also referred to an application header) indicating to the NIC firmware (FW) that this is OOB SMS and intended for the manageability engine. Subsequently, the network interface card 212 will send an appropriate AT command to the manageability engine over the SMBus indicative of the receipt of such message. The manageability engine will use the appropriate AT commands to read the SMS message. In some embodiments, if the manageability engine is not ready to read the SMS message, the network interface card 212 will store the message and will deliver the message to the manageability engine at a later period of time.

The manageability engine may manage the computing device 202 in response to receipt of the theft message (4). In one embodiment, the manageability engine disables the entire or portion of the computing device 202 in response to a lock message received from the network interface card 212. As can be seen, messages from the chipset 302/manageability engine 214 may be delivered to the theft management server 204 in a similar manner.

More particularly, the message flow from the chipset 302 to the theft management server 204 is represented by reference numerals 5, 6, and 7. In some embodiments, the computing device 202 is disabled in response to receipt of the lock message by the chipset 302 of the computing device 202 (such as discussed with reference to FIGS. 1-2). Further, an acknowledgement of the computing device being successfully locked may be delivered to the theft management server as represented by the message flow 5, 6, and 7.

Further, in an embodiment, information regarding the location of the computing device 202 in the stolen mode may also be transmitted to the theft management server 204 in a secure manner over 3G SMS interface. Once the computing device 202 is recovered from the specified location, the theft management server 204 may send a remote unlock message to the chipset of the computing device to unlock the device. Again, the unlock message to the chipset may be delivered using the WWAN.

The theft payloads exchanged between the theft management server 204 and the manageability engine 214 are protected with integrity check and replay attack prevention using pre-provisioned keys in some embodiments. Therefore, the theft payload is transparent to intermediary nodes, i.e., nodes between the theft management server 204 and the manageability engine 214 such as 3G SMS gateway 206 and the WWAN network interface card 212. It should be noted that the intermediary nodes will not alter the payload and will forward it over the appropriate interface, according to an embodiment.

In operation, once the manageability engine verifies the integrity of the received theft message (e.g., a "lock request" message), it queues the appropriate action (such as computing device disable action). Such action may be executed immediately after successful transmission of the lock reply. Furthermore, the manageability engine uses a "lock reply" to send the confirmation indicating the receipt of the "lock request" and its execution status.

The out-of-band message delivery technique described in the embodiments above does not have dependency on the user/host operating system and does not require the computing device to maintain IP connectivity. Further, the theft management server 204 can deliver the theft messages to the computing device 202 in all ACPI power and host/user operating system health states. Since the theft messages are processed and executed with chipset 302 of the computing device 202, it provides relatively secure and robust anti-theft technique for computing devices.

In some embodiments, since a 3G network does not guarantee the reliable and in-order delivery of SMS messages, SMS messages sent by the theft management server 204 may be queued in the network due to several reasons (e.g., device is not attached, air-interface resource issues, etc.). Further, all theft alerts may be accompanies or include sequence numbers or timestamp which will help the ME 214 (and/or the chipset 302) to determine the right order of received SMS messages to prevent any race conditions and discard certain messages if needed.

Figure 4:
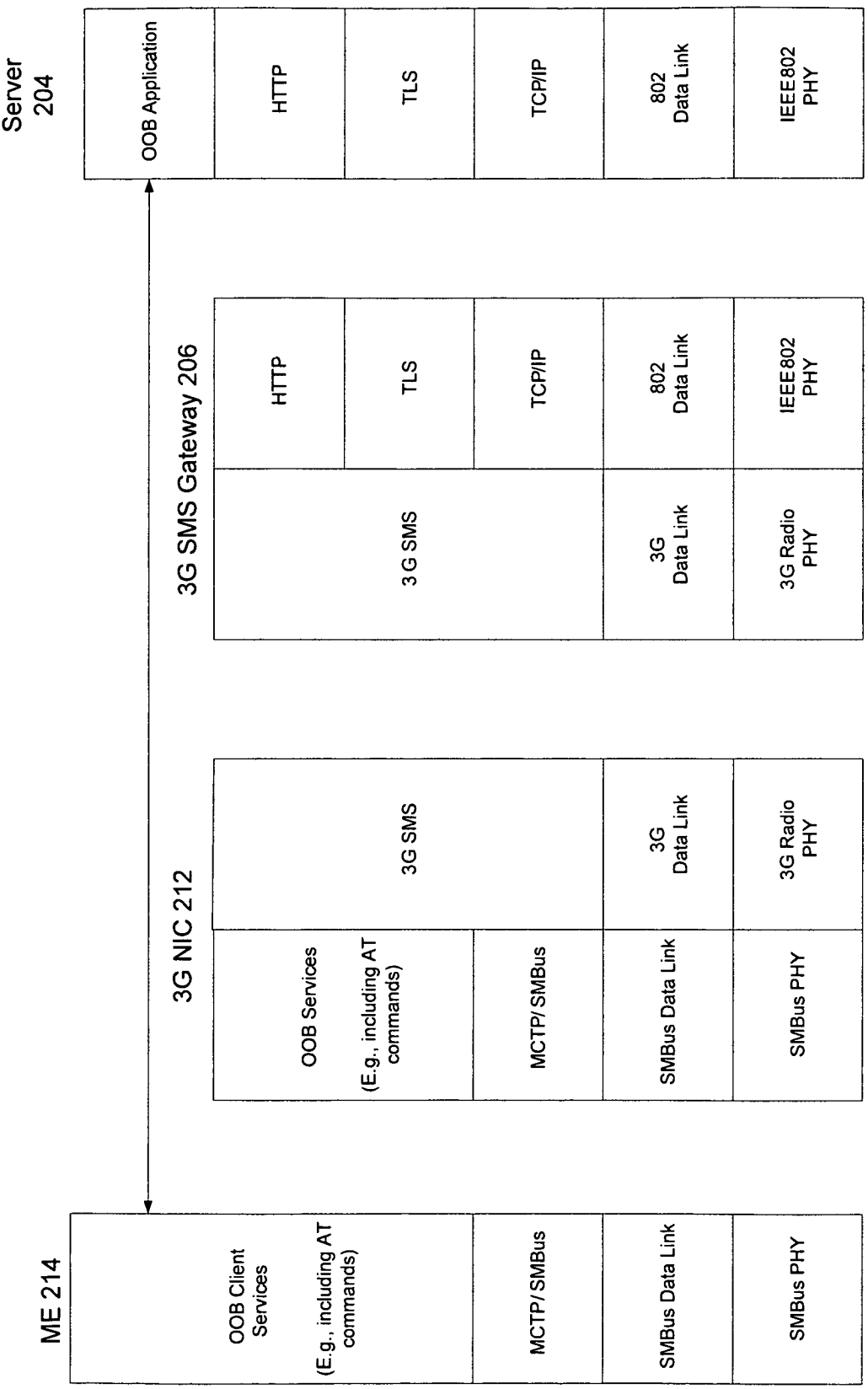
FIG. 4 illustrates a block diagram of protocol stacks that may be used in various components, according to some embodiments.

FIG. 4 illustrates a block diagram of protocol stacks that may be used in various components, according to some embodiments. In an embodiment, the ME 214, NIC 212, SMS gateway 206, and theft management server 204 of FIGS. 1-3 may include the respective protocol stacks shown in FIG. 4.

As shown, the ME 214 may include OOB client services (e.g., including AT commands such as discussed previously), a component management transport protocol service (e.g., to support communication between different, intelligent components of a system that make up a platform management subsystem providing monitoring and control functions inside a managed system such as Management Component Transport Protocol (MCTP) protocol services provided by Distributed Management Task Force, Inc. (DMTF), version 1.0.0a, July 2007)/SMBus protocol support, SMBus data link, and/or SMBus Physical layer (PHY). While FIG. 4 discusses MCTP as an example, embodiments may be implemented by using MCTP, a subset of MCTP or a proprietary transport protocol (e.g., to support communication between different, intelligent components of a system that make up a platform management subsystem providing monitoring and control functions inside a managed system).

NIC 212 may include OOB services, MCTP/SMBus protocol support, SMBus data link, and/or SMBus PHY (e.g., to communicate with their counterparts in ME 214). To facilitate communication via a 3G network, NIC 212 may include 3G SMS, 3G data link, and/or 3G Radio PHY. The SMS gateway 206 may include 3G SMS, 3G data link, and/or 3G radio PHY (e.g., to communicate with their counterparts in NIC 212), The SMS gateway 206 may also include HyperText Transfer Protocol (HTTP), Transport Layer Security (TLS), Transmission Control Protocol (TCP)/IP, IEEE 802 data link, and/or IEEE 802 PHY. And, server 204 may include a OOB application to communicate with the OOB client services of ME 214. The server 204 may also include HTTP, TLS, TCP/IP, IEEE 802 data link, and/or IEEE 802 PHY (e.g., to communicate with their counterparts in SMS gateway 206).

In some embodiments, although the OOB message delivery to the chipset described herein may be targeted to enable Theft Deterrence Technology (TDT) usages (e.g., remote lock, unlock, and location beaconing, etc.), techniques discussed herein may also be used for other usages that may benefit from OOB message delivery to a computing device without any dependency on the user/host OS or user initiated communication. For example, the management server may request asset information from the ME. Or, some security server may check the authenticity of the computing device by sending an OOB SMS to the ME (without going through the host/user OS) for requesting some data before processing a transaction.

Figure 5:
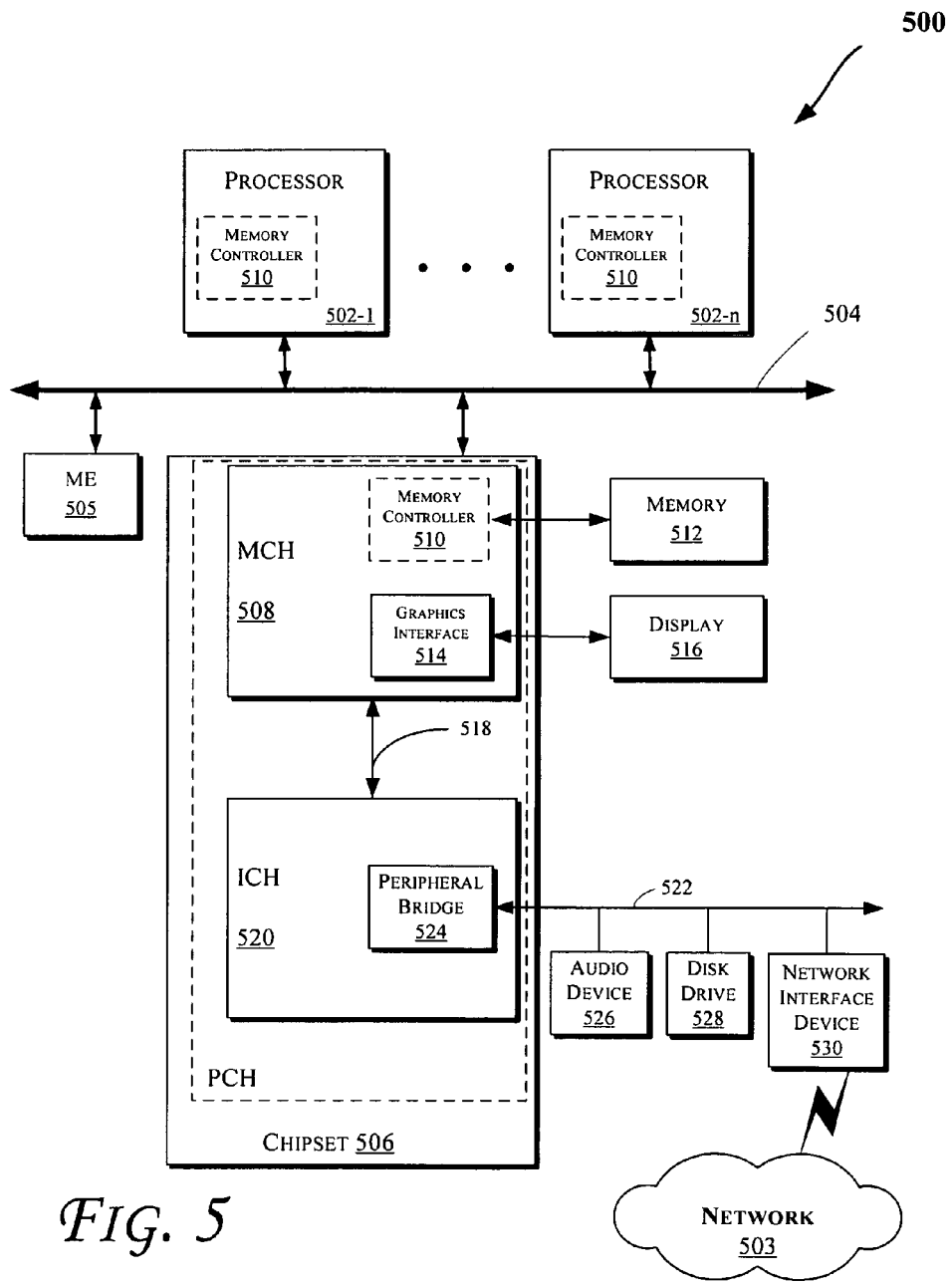
FIGS. 5-6 illustrate block diagrams of computing systems, according to some embodiments.

The theft management system described above may be employed for a computer system (such as the systems discussed with reference to FIGS. 5 and/or 6), a wireless communicator, a hand-held device, etc. For example, FIG. 5 illustrates a block diagram of a computing system 500 in accordance with an embodiment of the invention. For example, the computing device 202, the server 204, and/or the SMS gateway 206 of FIG. 2 may include one or more of the components of System 500. The computing system 500 may include one or more central processing unit(s) (CPUs) 502 or processors that communicate via an interconnection network (or bus) 504. In some embodiments, a management unit (ME) 505 may be coupled the bus 504 (however, an ME may be provided elsewhere in the system 500 such as within the device 530, chipset 506, CPU(s) 502, etc. and further it may be coupled to components of system 500 via a sideband bus as discussed with reference to FIGS. 1-4, for example). The processors 502 may include a general purpose processor, a network processor (that processes data communicated over a computer network 503), or other types of a processor (including a reduced instruction set computer (RISC) processor or a complex instruction set computer (CISC)). Moreover, the processors 502 may have a single or multiple core design. The processors 502 with a multiple core design may integrate different types of processor cores on the same integrated circuit (IC) die. Also, the processors 502 with a multiple core design may be implemented as symmetrical or asymmetrical multiprocessors. Also, the operations discussed with reference to FIGS. 1-4 may be performed by one or more components of the system 500.

A chipset 506 may also communicate with the interconnection network 504. The chipset 506 may include a memory control hub (MCH) 508. The MCH 508 may include a memory controller 510 that communicates with a memory 512. The memory 512 may store data, including sequences of instructions, that may be executed by the CPU 502, or any other device included in the computing system 500. In one embodiment of the invention, the memory 512 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 504, such as multiple CPUs and/or multiple system memories.

The MCH 508 may also include a graphics interface 514 that communicates with a display device 516. In one embodiment of the invention, the graphics interface 514 may communicate with the display device 516 via an accelerated graphics port (AGP) or PCIe. In an embodiment of the invention, the display 516 (such as a flat panel display) may communicate with the graphics interface 514 through, for example, a signal converter that translates a digital representation of an image stored in a storage device such as video memory or system memory into display signals that are interpreted and displayed by the display 516. The display signals produced by the display device may pass through various control devices before being interpreted by and subsequently displayed on the display 516.

A hub interface 518 may allow the MCH 508 and an input/output control hub (ICH) 520 to communicate. The ICH 520 may provide an interface to I/O device(s) that communicate with the computing system 500. The ICH 520 may communicate with a bus 522 through a peripheral bridge (or controller) 524, such as a peripheral component interconnect (PCI) bridge, a universal serial bus (USB) controller, or other types of peripheral bridges or controllers. The bridge 524 may provide a data path between the CPU 502 and peripheral devices. Other types of topologies may be utilized. Also, multiple buses may communicate with the ICH 520, e.g., through multiple bridges or controllers. Moreover, other peripherals in communication with the ICH 520 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 522 may communicate with an audio device 526, one or more disk drive(s) 528, and a network interface device 530 (which is in communication with the computer network 503). In an embodiment, the network interface device 530 may be the same or similar to the NIC 212 of FIGS. 1-4. Other devices may communicate via the bus 522. Also, various components (such as the network adapter 530) may be coupled to the MCH 508 in some embodiments of the invention. In addition, the processor 502 and the MCH 508 may be combined to form a single chip. In an embodiment, the memory controller 510 may be provided in one or more of the CPUs 502. Further, in an embodiment, MCH 508 and ICH 520 may be combined into a Peripheral Control Hub (PCH).

Furthermore, the computing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 6:
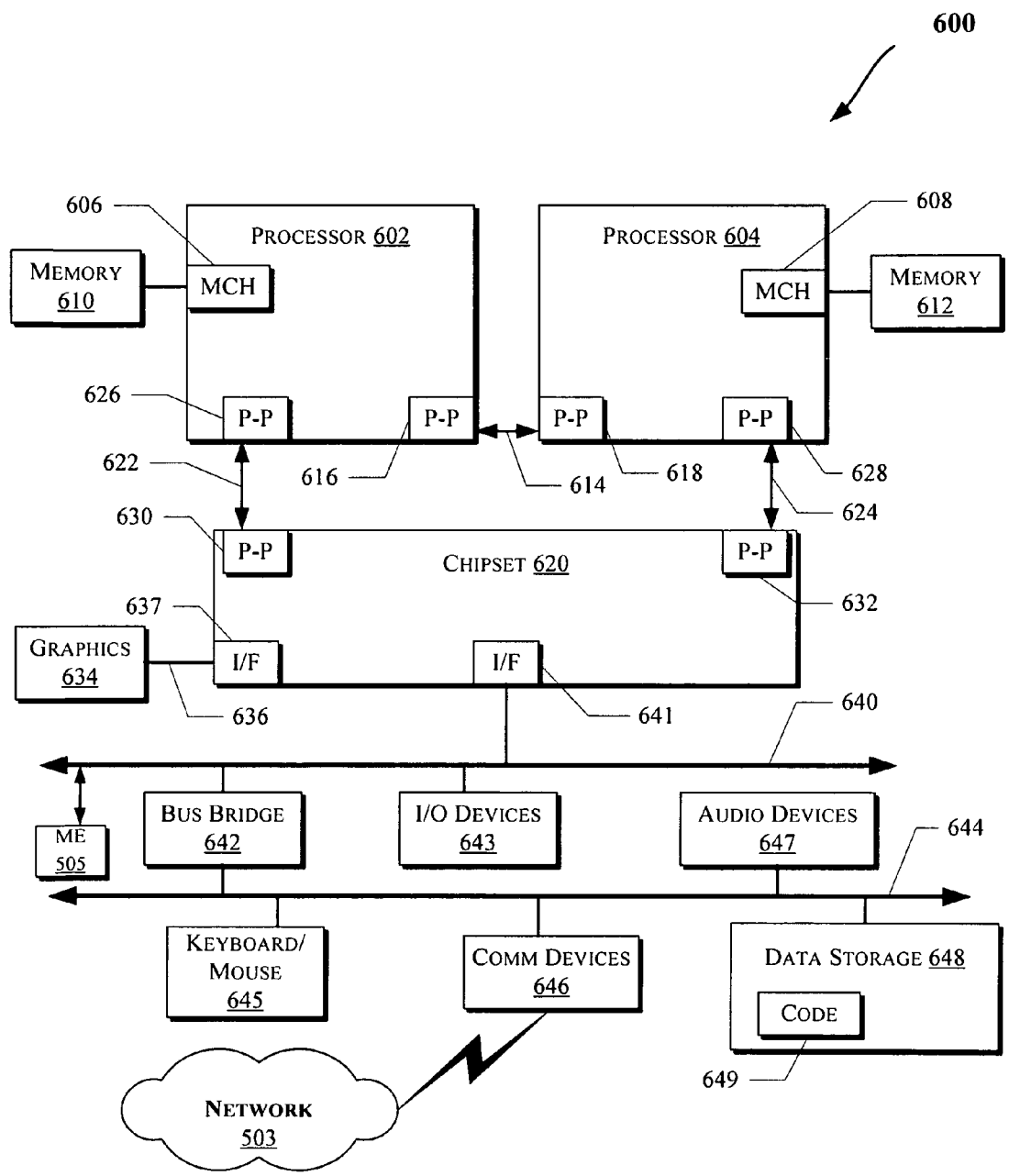

FIG. 6 illustrates a computing system 600 that is arranged in a point-to-point (PtP) configuration, according to an embodiment of the invention. In particular, FIG. 6 shows a system where processors, memory, and input/output devices are interconnected by a number of point-to-point interfaces. The operations discussed with reference to FIGS. 1-5 may be performed by one or more components of the system 600.

As illustrated in FIG. 6, the system 600 may include several processors, of which only two, processors 602 and 604 are shown for clarity. The processors 602 and 604 may each include a local memory controller hub (MCH) 606 and 608 to enable communication with memories 610 and 612. The memories 610 and/or 612 may store various data such as those discussed with reference to the memory 512 of FIG. 5.

In an embodiment, the processors 602 and 604 may be one of the processors 502 discussed with reference to FIG. 5. The processors 602 and 604 may exchange data via a point-to-point (PtP) interface 614 using PtP interface circuits 616 and 618, respectively. Also, the processors 602 and 604 may each exchange data with a chipset 620 via individual PtP interfaces 622 and 624 using point-to-point interface circuits 626, 628, 630, and 632. The chipset 620 may further exchange data with a graphics circuit 634 via a graphics interface 636, e.g., using a PtP interface circuit 637.

At least one embodiment of the invention may be provided within the processors 602 and 604. Other embodiments of the invention, however, may exist in other circuits, logic units, or devices within the system 600 of FIG. 6. Furthermore, other embodiments of the invention may be distributed throughout several circuits, logic units, or devices illustrated in FIG. 6.

The chipset 620 may communicate with a bus 640 using a PtP interface circuit 641. The bus 640 may communicate with one or more devices, such as a bus bridge 642, ME 505 (which may be coupled via a sideband bus such as discussed with reference to FIGS. 1-5), and/or I/O devices 643. Via a bus 644, the bus bridge 642 may communicate with other devices such as a keyboard/mouse 645, communication devices 646 (such as modems, network interface devices, or other communication devices that may communicate with the computer network 503), audio I/O device 647, and/or a data storage device 648. In an embodiment, the communication devices 646 may be the same or similar to the NIC 212 of FIGS. 1-4. The data storage device 648 may store code 649 that may be executed by the processors 602 and/or 604.

In various embodiments of the invention, the operations discussed herein, e.g., with reference to FIGS. 1-6, may be implemented as hardware (e.g., circuitry), software, firmware, microcode, or combinations thereof, which may be provided as a computer program product, e.g., including a machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed herein. Additionally, such computer-readable media may be downloaded as a computer program product, wherein the program may be transferred from a remote computer (e.g., a server) to a requesting computer (e.g., a client) via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A method comprising:
receiving an out-of-band (OOB) notification indicative of theft of a computing device;
transmitting a theft message representative of the theft to the computing device via a wireless wide area network, wherein at least one component of the computing device is disabled in response to receipt of the theft message, wherein the theft message is detected based on filtering of an incoming Short Message Service (SMS) message, wherein an application header of the SMS message is examined for a vendor identifier in response to receipt of the incoming SMS message and the incoming SMS message is determined to be the theft message if the vendor identifier matches a pre-configured vendor identifier, wherein receiving the notification or transmitting the theft message is performed at a theft management server, a service organization, or combinations thereof from or to the computing device via a 3G network, wherein the computing device comprises a manageability engine to transmit a message indicative of the disabled state of the computing device to the theft management server, and wherein the theft management server and the computing device send and receive messages without dependency on a user or host operating system of the computing device.

2. The method of claim 1, wherein transmitting the theft message to the computing device is performed through a 3G Short Message Service (SMS) gateway.

3. The method of claim 1, wherein the at least one component of the computing device is disabled in response to transmission of a remote lock message to a network interface card of the computing device.

4. The method of claim 3, wherein the remote lock message is transmitted to the computing device through a 3G SMS gateway.

5. The method of claim 3, further comprising causing transmission of the theft message to a chipset of the computing device through a side band bus.

6. The method of claim 1, wherein transmitting the theft message causes locking of the computing device in response to receipt of the theft message by a chipset of the computing device.

7. The method of claim 1, further comprising receiving a location of the computing device via the wireless wide area network.

8. The method of claim 7, further comprising, in response to recovery of the computing device from the location, transmitting a remote unlock message to the computing device.

9. The method of claim 1, further comprising transmitting an unlock message to a chipset of the computing device to cause unlocking of the computing device.

10. The method of claim 1, wherein transmitting the theft message causes processing of the theft message with hardware security versus in software or basic input/output system (BIOS) of the computing device.

11. The method of claim 1, wherein a determination that the theft message is from an authentic sender is performed based on a comparison of information in a header of the theft message and an address of an originator of the theft message.

12. The method of claim 1, further comprising silently discarding the theft message in response to a determination that the theft message is from an unauthentic sender.

13. The method of claim 1, wherein the application header indicates whether the incoming SMS message carries an OOB message.

14. A system comprising:
a theft management server to detect a theft of a computing device in response to an OOB notification, wherein the theft management server transmits a theft alert message to a wireless module of the computing device via a message service gateway, wherein the theft message is detected based on filtering of an incoming Short Message Service (SMS) message, wherein an application header of the SMS message is examined for a vendor identifier in response to receipt of the incoming SMS message and the incoming SMS message is determined as the theft message if the vendor identifier matches a pre-configured vendor identifier, wherein the OOB notification is received or the theft message is transmitted at a theft management server, a service organization, or combinations thereof from or to the computing device via a 3G network, wherein the computing device comprises a manageability engine to transmit a message indicative of the disabled state of the computing device to the theft management server, and wherein the theft management server and the computing device send and receive messages without dependency on a user or host operating system of the computing system.

15. The system of claim 14, wherein the message service gateway is a 3G SMS gateway and the theft management server transmits the theft alert message to the wireless module via the 3G SMS gateway using an Internet Protocol connection.

16. The system of claim 14, wherein the computing device comprises the manageability engine to receive the theft message from the wireless module and to manage the computing device in response to receipt of the theft alert message.

17. The system of claim 16, wherein the manageability engine disables at least one component of the computing device in response to a lock message received from the wireless module.

18. The system of claim 16, wherein the manageability engine transmits a location of the computing device to the theft management server via a wireless wide area network when the system is in stolen mode.

19. An apparatus comprising:
a management unit to receive a lock message from a wireless network interface over a sideband bus and to cause one or more components of a computing device to become disabled,
wherein the lock message is received from a remote server and wherein the remote server generates the lock message in response to an OOB message indicative of theft of the computing device, wherein the lock message is detected based on filtering of an incoming Short Message Service (SMS) message, wherein an application header of the SMS message is examined for a vendor identifier in response to receipt of the incoming SMS message and the incoming SMS message is determined as the lock message if the vendor identifier matches a pre-configured vendor identifier, wherein the OOB message is received or the lock message is transmitted at a theft management server, a service organization, or combinations thereof from or to the computing device via a 3G network, wherein the computing device comprises a manageability engine to transmit a message indicative of the disabled state of the computing device to the theft management server, and wherein the theft management server and the computing device send and receive messages without dependency on a user or host operating system of the computing device.

20. The apparatus of claim 19, wherein a payload of the lock message comprises the application header.

21. The apparatus of claim 19, wherein the application header comprises the vendor identifier, information to indicate existence of an OOB message in the lock message, and an operator address.

22. The apparatus of claim 19, wherein the wireless network interface checks a portion of the message to determine whether the message is not a mobile initiated SMS.

23. The apparatus of claim 19, wherein the wireless network interface checks a portion of the message to determine whether the message is from a different originator than an originator of the message.

24. The apparatus of claim 19, wherein the wireless network interface communicates in accordance with one or more of: 3G, WiMAX, Bluetooth, radio frequency, WiFi, or Institute of Electrical and Electronics Engineers (IEEE) 802.11n.

25. A non-transitory computer-readable medium comprising one or more instructions that when executed on a processor configure the processor to perform one or more operations to:
receive an out-of-band (OOB) notification indicative of theft of a computing device;
transmit a theft message representative of the theft to the computing device via a wireless wide area network, wherein at least one component of the computing device is disabled in response to receipt of the theft message, wherein the theft message is detected based on filtering of an incoming Short Message Service (SMS) message, wherein an application header of the SMS message is examined for a vendor identifier in response to receipt of the incoming SMS message and the incoming SMS message is determined to be the theft message if the vendor identifier matches a pre-configured vendor identifier, wherein receiving the notification or transmitting the theft message is performed at a theft management server, a service organization, or combinations thereof from or to the computing device via a 3G network, wherein the computing device comprises a manageability engine to transmit a message indicative of the disabled state of the computing device to the theft management server, and wherein the theft management server and the computing device send and receive messages without dependency on a user or host operating system of the computing device.

26. The computer-readable medium of claim 25, further comprising one or more instructions that when executed on a processor configure the processor to transmit the theft message to the computing device through a 3G SMS gateway.

* * * * *